(12) United States Patent
Schliesser

(10) Patent No.: US 12,479,611 B2
(45) Date of Patent: Nov. 25, 2025

(54) DEVICE AND METHOD FOR PRODUCING PLUMP PACKAGES FILLED WITH LIQUID OR PASTY FILLING MATERIAL

(71) Applicant: Albert Handtmann Maschinenfabrik Gmbh & Co. KG, Biberach (DE)

(72) Inventor: Markus Schliesser, Wain (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 18/737,549

(22) Filed: Jun. 7, 2024

(65) Prior Publication Data

US 2024/0409255 A1    Dec. 12, 2024

(30) Foreign Application Priority Data

Jun. 9, 2023   (EP) ..................................... 23178387

(51) Int. Cl.
  *B65B 9/12*    (2006.01)
  *A23P 30/20*   (2016.01)
  *B65B 9/20*    (2012.01)

(52) U.S. Cl.
  CPC ................ *B65B 9/12* (2013.01); *A23P 30/20* (2016.08); *B65B 9/2049* (2013.01)

(58) Field of Classification Search
  CPC ........... B65B 25/00; B65B 9/042; B65B 9/12; B65B 9/20; B65B 9/2049; A22C 11/02; A22C 11/0209; A22C 11/00; A22C 11/0245; A22C 11/029; A22C 11/107

USPC ..................... 53/450; 452/32, 35, 40, 44, 45
  See application file for complete search history.

(56) References Cited

U.S. PATENT DOCUMENTS

| 2005/0221743 A1* | 10/2005 | Reutter ................ A22C 11/107 452/51 |
| 2012/0295005 A1* | 11/2012 | Kleckner ............. A22C 11/029 426/574 |
| 2014/0170945 A1* | 6/2014 | Bachtle .................. A22C 11/02 452/32 |

FOREIGN PATENT DOCUMENTS

| EP | 1582098 B1 | 6/2007 |
| EP | 2742804 A1 | 6/2014 |

* cited by examiner

*Primary Examiner* — Jacob A Smith
(74) *Attorney, Agent, or Firm* — McCoy Russell LLP

(57) ABSTRACT

The disclosure relates to a device and a method for producing packages, in particular sachets, filled with liquid or pasty filling material, in particular with liquid or pasty food, with a co-extrusion device for co-extruding a strand made of curable casing material filled with the filling material, wherein the co-extrusion device comprises a filling tube for ejecting the filling material as well an extrusion nozzle being associated with the filling tube and having an extrusion gap for ejecting the casing material, the filling tube protrudes over the extrusion gap over a distance X such that the casing material is extruded through the extrusion gap onto the filling tube and can solidify along the filling tube. The protruding filling tube there expands at least in sections in the direction of the outlet opening and stretches the extruded casing to create a plump package.

19 Claims, 8 Drawing Sheets

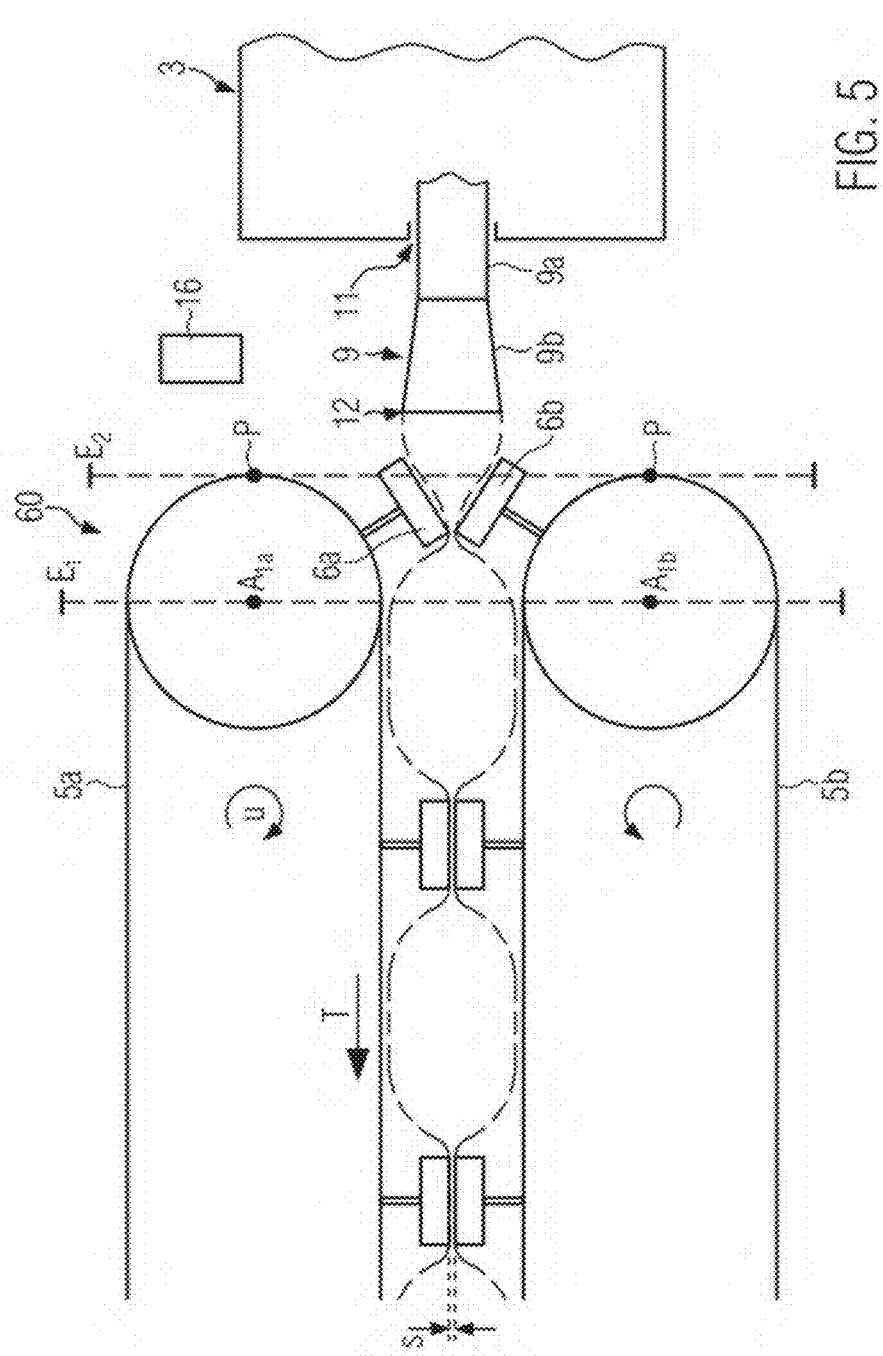

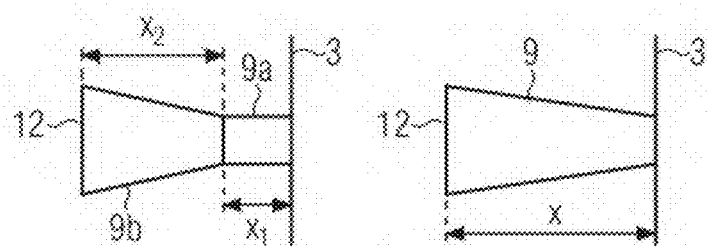
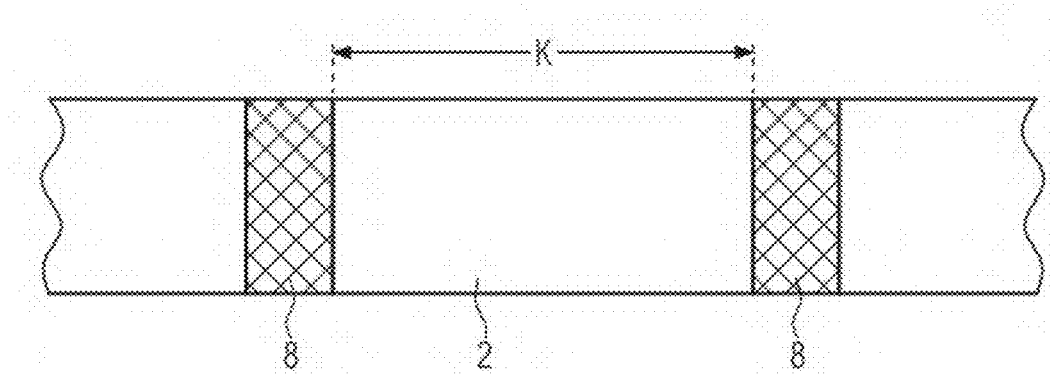
FIG. 7a
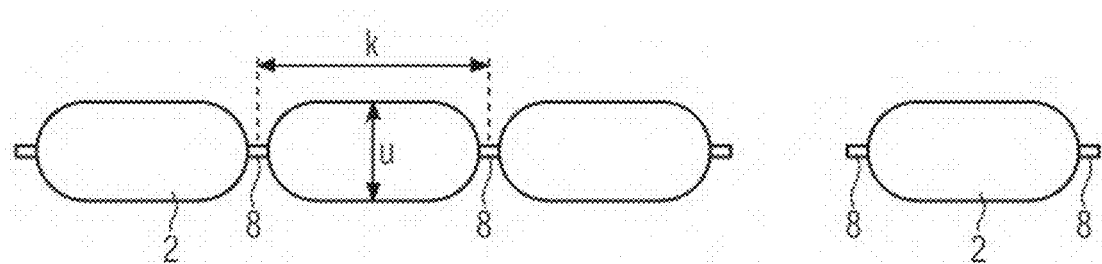
FIG. 7b

DEVICE AND METHOD FOR PRODUCING PLUMP PACKAGES FILLED WITH LIQUID OR PASTY FILLING MATERIAL

CROSS REFERENCE TO RELATED APPLICATION

The present application claims priority to European Patent Application No. 23 178 387.9 filed on Jun. 9, 2023. The entire contents of the above-listed application are hereby incorporated by reference for all purposes.

TECHNICAL FIELD

The present disclosure relates to producing packages, in particular sachets, filled with liquid filling material, in particular food.

BACKGROUND

It is already known from prior art to package a filling material, e.g. cosmetics, food, etc. into individual packages, in particular so-called sachets. Sachets are a special form of packages that have planar end regions that are flattened at their ends. Such packages are typically produced using flow pack machines. FIG. 11 shows, for example, the mode of operation of such a vertical flow pack machine. For this purpose, a packaging material casing is created, wound around a shaped tube and sealed by way of a longitudinal sealing seam. The tube created in this way is filled by way of the shaped tube with the product to be packaged, e.g. ketchup, and sealed on a transverse sealing seam using a sealing die. The sealing dies typically have to remain closed for a certain period of time during the filling process, which reduces production performance. On the other hand, a sufficient sealing time is necessary to create the sealing point with sufficient strength. The casing often sticks together during the sealing process. Overall, the method described above is complex and only suitable to a limited extent when using biodegradable casing materials (co-extruded casings), such as alginate casings, pectin casings or collagen casings.

FIG. 12 schematically shows a horizontal tubular bag machine which has problems similar to the vertical tubular bag machine shown in the context of FIG. 11. In particular, no liquid can be packaged with the horizontal tubular bag machine.

But packages filled with liquid or pasty filling material that are divided by linking are also already known from prior art.

SUMMARY

The inventors herein have recognized that it is particularly desirable to have individual packets produced to be plump.

Proceeding from there, the present disclosure is based on the object of providing a device and a method for the simplified and more efficient and environmentally friendly production of plump packages filled with liquid or pasty filling material, in particular sachets.

According to the disclosure, this object is satisfied by a device and method for for producing packages, such as sachets filled with liquid or pasty filling material, such as food. The device may include a co-extrusion device for co-extruding a strand made of a curable casing material filled with said filling material, wherein said co-extrusion device comprises a filling tube for ejecting said filling material, as well as an extrusion nozzle being associated with said filling tube and having an extrusion gap for ejecting said casing material, said filling tube being a protruding filling tube protruding over said extrusion gap over a distance X such that said casing material is extruded through said extrusion gap onto said filling tube and can solidify along said filling tube, wherein said protruding filling tube expands at least in sections in the direction of said outlet opening.

According to the disclosure, the device for producing packages, in particular sachets, filled with liquid or pasty filling material, in particular food, comprises a co-extrusion device for co-extruding a strand made of a casing material filled with the filling material. Such a co-extrusion device extrudes the filling material or the food, respectively, and the casing material at the same time. Such a co-extrusion device is suitable for extruding, as a casing material, a casing material that can be cured using a fixation solution, in particular a gel, preferably a biodegradable casing material, such as an alginate gel, pectin or a collagen gel. An alginate gel is particularly advantageous for food. A calcium chloride solution, for example, can be used as a fixation solution. The fixation solution is applied, for example, to the extruded casing in the region of the protruding filling tube (e.g., to the protruding filling tube region).

The packages enclose the filling material tightly, where a sachet is a special design of a package that has planar, planar sectioning points at its ends.

Liquid is presently to mean, for example, a filling material having a viscosity of e.g. <=70,000 mPas at 20° C., i.e. also filling material that has a consistency like ketchup or mustard, soup, shampoo, cream, honey, jam, etc., in particular e.g. <5000 mPas at 20° C. (e.g. also applesauce, baby food, salad dressing) and further in particular e.g. <=1000 mPas at 20° C. (e.g. also juice, oil). However, the device is just as well also suitable for producing sachets filled with pasty filling material having higher viscosities.

According to the disclosure, the co-extrusion device comprises a filling tube for ejecting the filling material or food, respectively, as well as an extrusion nozzle associated with the filling tube and having a substantially, for example, ring-shaped extrusion gap for ejecting the casing material. The filling tube is a protruding filling tube that protrudes over the extrusion gap preferably over a distance X such that the casing material can be extruded through the extrusion gap onto the filling tube and can solidify at least in part along the filling tube, i.e. when, for example, a fixation solution is applied onto the filling tube. A configuration in which the filling tube protrudes over the extrusion nozzle for the casing material is particularly advantageous because the distance between the filling tube and a downstream unit, such as a transport device or a displacement device, can then be minimized. This has the advantage that the extruded material does not sag downwards and that the strand is sectioned at the earliest possible point in time.

The protruding filling tube is particularly advantageous because its shape and size, i.e. cross-sectional area, can be changed. This is not possible with co-extrusion devices without a protruding filling tube.

According to the disclosure, the protruding filling tube widens in the direction towards the outlet opening. This means that the circumference of the filling tube increases in the ejection direction, i.e. in the direction towards the outlet opening of the filling tube.

The cross-sectional shape can there remain the same over the length of the filling tube, e.g. have a uniform round cross-section or can change—as long as the circumference, the cross-sectional area or the circumference, increases. For example, the cross-sectional shape of the outlet opening can have a lower height than at the beginning of the filling tube but a greater width—i.e. the filling tube is formed to be flatter but at the same time the circumference or the cross-sectional area of the outlet opening is larger than at the beginning of the filling tube.

The fact that the filling tube does not have a uniform cross-sectional area over its length, but rather the cross-sectional area or the circumference expands in the direction towards the outlet opening, i.e. the protruding filling tube expands at least in sections in the direction towards the outlet opening, results in the advantage that the product can be filled to be plumper. When the casing is extruded onto the filling tube, it has not yet completely cured and is drawn and stretched over the expanding filling tube during the curing process, in particular over a conc. As a result, the casing has a greater pretension, which means that the package or sachet can be filled to be plumper. If the outer diameter of the filling tube were uniform, then the package or sachet would be filled more loosely, since the curable casing has no "nominal size" but expands, similar to a balloon. Attractive packages or sachets can thus be produced.

According to an embodiment, the device can comprise a lubricant device for supplying a lubricant (e.g. water or a fixation solution) between the filling tube and the ejected casing material. It has been shown that such a configuration is particularly suitable for the production of the sachets, since the casing can then be produced gently onto the filling tube and drawn off therefrom. This is particularly advantageous when the outer contour changes, since the extruded casing material then slides on the lubricant film and is not damaged. This is particularly advantageous if the external shape also changes during expansion, e.g. from a cylindrical outer contour to a polygonal shape, e.g. a rectangular outer contour, possibly with rounded corners.

According to embodiments, the protruding filling tube expands conically at least in sections. A conical expansion is particularly gentle on the casing.

According to a further embodiments, a front section of the filling tube, when viewed in the ejection or transport direction, has a first cross-sectional area and has in particular a cylindrical outer contour. A rear section, when viewed in the ejection direction or transport direction, has an expanding cross-sectional area and has in particular a frustoconical outer contour.

The entire protruding filling tube is advantageously arranged to be exchangeable or the front section of the protruding filling tube can be fixedly arranged on the co-extrusion head and the rear section is arranged to be exchangeable. By simply exchanging the filling tube or the rear section, the plumpness of the package or sachet can be changed or the shape can be changed, for example, from a round cross-section to a rectangular cross-section, etc.

According to an embodiment, the cross-sectional area of the protruding filling tube expands from the beginning of the protruding filling tube to the outlet opening by >0%-150%, preferably 10-100%. The plumpness of the finished product can be adjusted particularly well in this region.

According to an embodiment, the rear section can be formed from a material that differs from the front section, in particular from a plastic material, e.g. POM, PTFE, etc. The front section or the entire filling tube can be produced from stainless steel. The use of an appropriate plastic material makes it easier to form transitions from the front section, which has, for example, a cylindrical outer contour, to a rear section, which has a differing outer contour. This means that smooth transitions can be created.

According to an embodiment, the front section of the filling tube has a shorter length than the rear section of the filling tube. This is particularly advantageous if smooth transitions of the outer contour are desired.

The device advantageously comprises a sectioning device for dividing the strand into individual packages or sachets and to seal them in a liquid-tight manner.

According to one embodiment, the sectioning device comprises a displacement device which displaces the material of the strand at a sectioning point, in particular in the form of oppositely disposed displacement elements engaging in the strand. The displacement elements can be moved linearly towards one another or can be arranged circumferentially, for example, on circulating belts.

Furthermore, the device advantageously comprises a linking device via which the filling tube can be rotated such that the strand is linked and cured at the sectioning point, so that a tight point can be created between successive packages. After the sectioning point or the linking point has cured, the individual packages can be separated from each other, i.e. cut off. The expanding filling tube is particularly advantageous especially in combination with the above-mentioned displacement device and linking device, because plumpness is particularly desirable for these products.

In this case, a transport device can be arranged in the transport direction or ejection direction downstream of the displacement device and be formed in particular in the form of oppositely disposed circulating transport apparatuses, in particular conveyor belts or chains, between which the packages produced can be transported. This transport device can transport the packages in a twist-proof manner, where the packages rest against and are held at the top and the bottom of the transport apparatus. The sectioning points can further cure during transport.

Alternatively, the sectioning device for producing sachets can be configured as follows.

According to an embodiment, the device comprises oppositely disposed circulating sectioning dies between which the strand produced by the co-extrusion device can be transported. The sectioning dies can strip the filling material, in particular the food, from the casing material at a sectioning point when they move towards one another in their trajectory and engage in the strand, and the casing material, which has not yet completely cured at this point, can be pressed in a planar manner at the sectioning point to form a sachet.

Since the oppositely disposed sectioning dies circulate, they are not aligned parallel to one another in the forward deflection region (which faces the co-extrusion device). When they move towards one another in the deflection region-until they are aligned substantially parallel to one another again-they strip out the inner mass, i.e. the filling material, so that there is no inner mass at the sectioning point but only a clean casing. The sectioning point can be pressed clean and sealed in a liquid-tight manner. In the case of a curable casing material, the casing material is not completely cured at the sectioning point, i.e. not completely cross-linked, so that the curable casing material can bond at the top and bottom side of the casing inside the sectioning point in a positive substance-fit manner, in particular in a homogeneous manner. This is possible because the sectioning dies engage in the co-extruded strand and the packaging material, i.e. the film described in prior art is not produced in advance.

Although the sectioning dies could also be arranged circumferentially on a shaft, it is particularly advantageous to have the device comprise a transport device with oppositely disposed circulating transport apparatuses, in particular conveyor belts or chains, on which the spaced sectioning dies are arranged. For example, there are around 1-100 sectioning dies arranged for every transport apparatus. The oppositely disposed sectioning dies in the deflection region of the transport apparatuses, in particular the conveyor belts, can be moved towards one another such that their planar pressing surfaces are initially aligned at an angle to one another when they engage in the strand. With a further motion out of the deflection region, the sectioning dies then come to lie parallel to one another such that the sectioning point can be pressed in a planar manner. During the transition from the deflection region to a region in which the pressing surfaces of the sectioning dies are aligned parallel to one another, the filling material, in particular food, is stripped out of the casing material, as described above. It is then particularly advantageous that, when the sachets produced in this manner are transported in the transport direction, the sectioning dies can further press the sectioning points, at least at a first section of the transport device. The sectioning points can therefore continue to cure during transport in the transport device and exit the device in a stable state.

The above-mentioned embodiments for producing the packages by linking them as well as producing the sachets using sectioning dies therefore allow for liquid-tight packaging of filling material because the displacement elements have displaced all of the filling material from the casing that has not yet cured and the sectioning dies create a compressed, smooth and wrinkle-free sectioning point of the casing material that has not yet cured completely.

It is advantageous to have the sectioning dies each comprise a planar pressing surface. The planar pressing surface has no projections or depressions, but is smooth. When pressed, it rests over the entire surface on the casing material. An in particular wrinkle-free sectioning point can thus be created so that no liquid can escape from the sectioning point when a sachet is filled with liquid or low-viscosity filling material, in particular with food. The casing material can therefore be pressed over the entire surface at the sectioning point.

A device for applying a fixation agent is preferably arranged, when viewed in the transport direction, forward of the circulating transport apparatuses, i.e. between the extrusion nozzle for the casing material and the transport device. The fixation agent already makes the casing sufficiently strong so that the dies do not destroy the casing material during the pressing process and the casing material is not damaged during the linking process. However, the casing material is still not completely cross-linked or gelled through so that a perfectly positive substance-fit connection between the upper and lower casing material can be ensured during the pressing process.

According to an embodiment, the device comprises a separating device which separates successive packages or sachets from one another in the region of the sectioning point. The separating device can also be formed such that the sectioning points are not completely severed, but only perforated.

According to a further embodiment of the device, alternating planar sectioning points and linked, i.e. rounded sectioning points can be created so that bag-like products are created.

According to the method of the disclosure for producing packages or sachets filled with liquid or pasty filling material, in particular food, a strand of curable casing material filled with filling material, in particular food, is extruded by way of a co-extrusion device.

The co-extrusion device comprises a filling tube for ejecting the filling material as well as an extrusion nozzle associated with the filling tube and having an extrusion gap for ejecting the casing material. The filling tube protrudes over the extrusion gap over a distance X and the casing material is extruded through the extrusion gap onto the filling tube and can solidify along the filling tube. The casing material is drawn over the protruding filling tube which expands at least in sections in the direction towards the outlet opening and is thereby stretched. This means that bulging products can be produced.

A fixation solution can be applied to the casing material on the protruding filling tube. The filling material can be displaced in the strand at a sectioning point and the casing material can be closed at the sectioning point, in particular by linking or by planar pressing.

The curable casing material can be a gel, in particular a biodegradable gel, preferably an alginate gel, pectin gel or collagen gel.

With the method according to the disclosure, packages, in particular sachets with a wrinkle-free, smooth, or linked off and therefore tight sectioning point can be produced in an improved manner in such a way that liquids can also be packaged.

The plumpness of the package or sachet can be significantly improved.

BRIEF DESCRIPTION OF THE FIGURES

The present disclosure shall be explained hereafter in more detail with reference to the following figures.

FIG. 5 schematically shows a more detailed view of an embodiment shown in FIG. 4.

FIG. 6 shows a side view of a filling tube that expands in the transport direction.

FIG. 7a schematically shows produced sachets in a chain and separated sachets.

FIG. 7b schematically shows produced packages in a chain and separated sachets.

DETAILED DESCRIPTION

Figure 1:
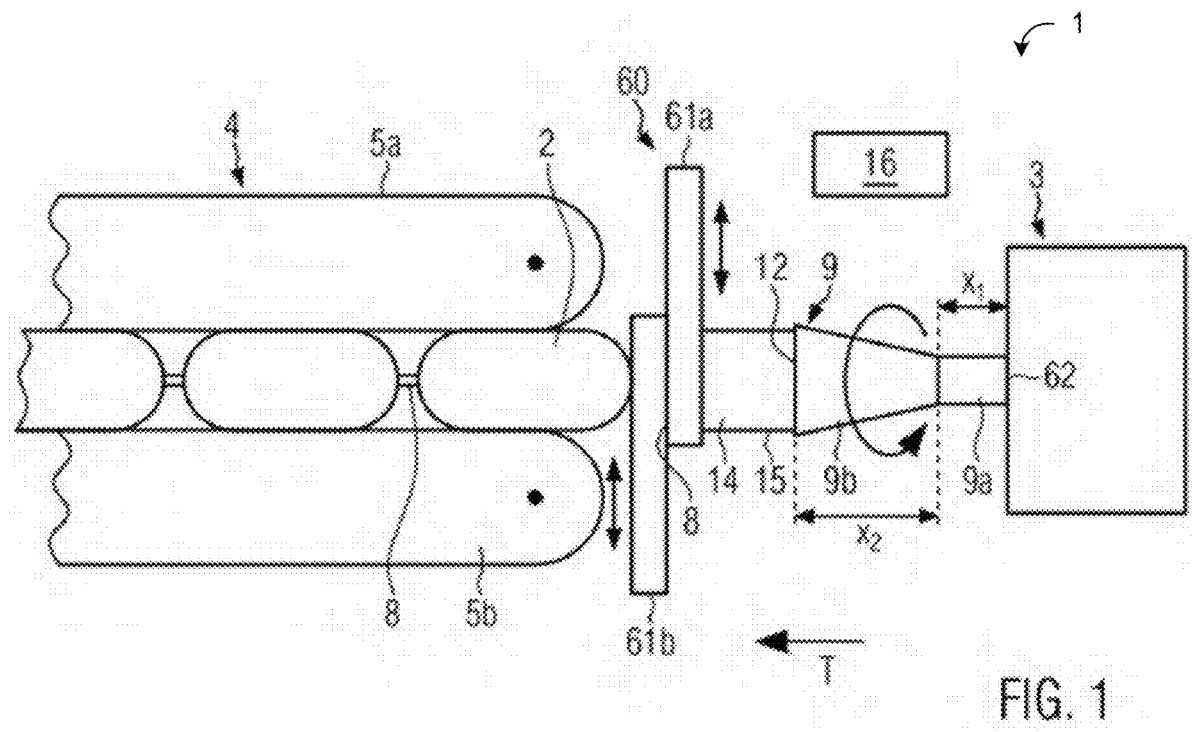
FIG. 1 shows a simplified schematic side view of a device according to an embodiment of the present disclosure.

FIG. 1 shows a simplified schematic view of a first embodiment of a device 1 for producing linked packages 2 filled with liquid or pasty filling material or food, as shown, for example, in FIG. 7b.

Figure 4:
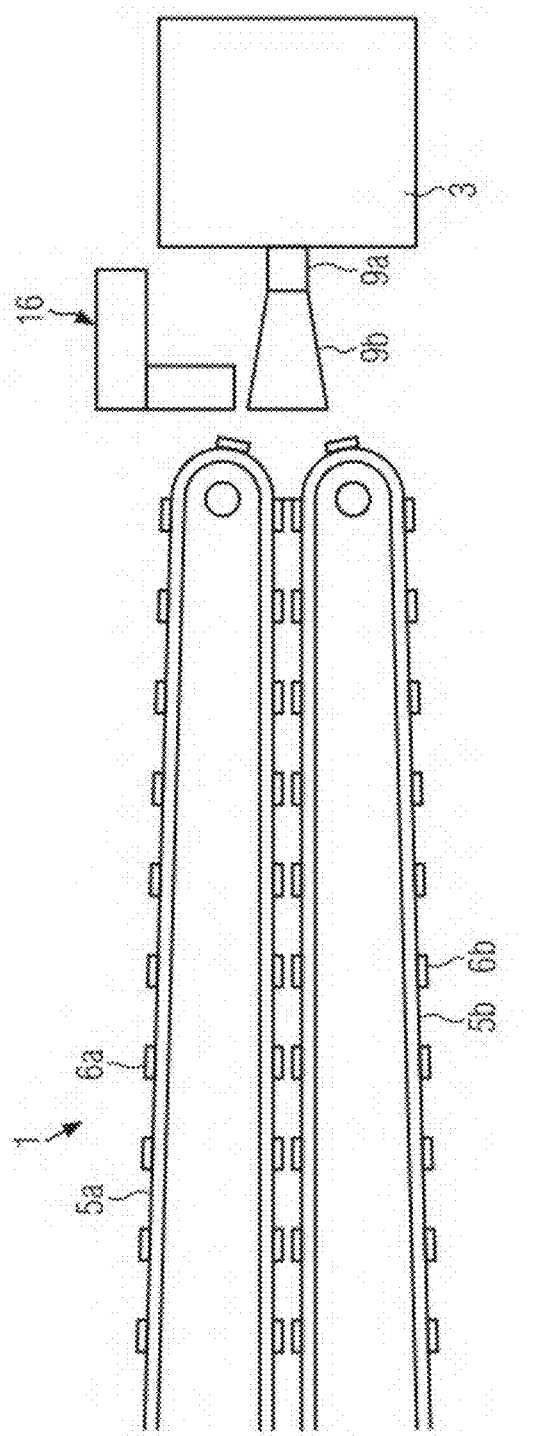
FIG. 4 very schematically shows a further embodiment according to the present disclosure.

FIGS. 4 and 5 show a second embodiment for producing packages, presently in the form of sachets, as shown, for example, in FIG. 7a.

The following embodiments shall be explained in more detail using food to be filled, but are also suitable for other filling materials, i.e. non-food.

Device 1 according to the first and the second embodiments comprises a co-extrusion device 3 for co-extruding a strand of casing material 15 filled with food 14. For example, ketchup, mustard, jam, honey and boiled sausage can be filled as food. Non-food products such as shampoo, cream, liquid detergent, etc. can also be used as filling material. But filling material or food with a higher viscosity can also be tightly packed with the device according to the disclosure-presently as well, the liquid-tight packaging is advantageous so that the product does not dry out.

Alginate gel, alternatively pectin gel or collagen gel is particularly suitable as curable casing material. Such materials are particularly advantageous because they are biodegradable and also consumable and the amount of plastic waste can be reduced. Such materials are commercially available, for example, as a paste or as a powder that is mixed with water.

Figure 3:
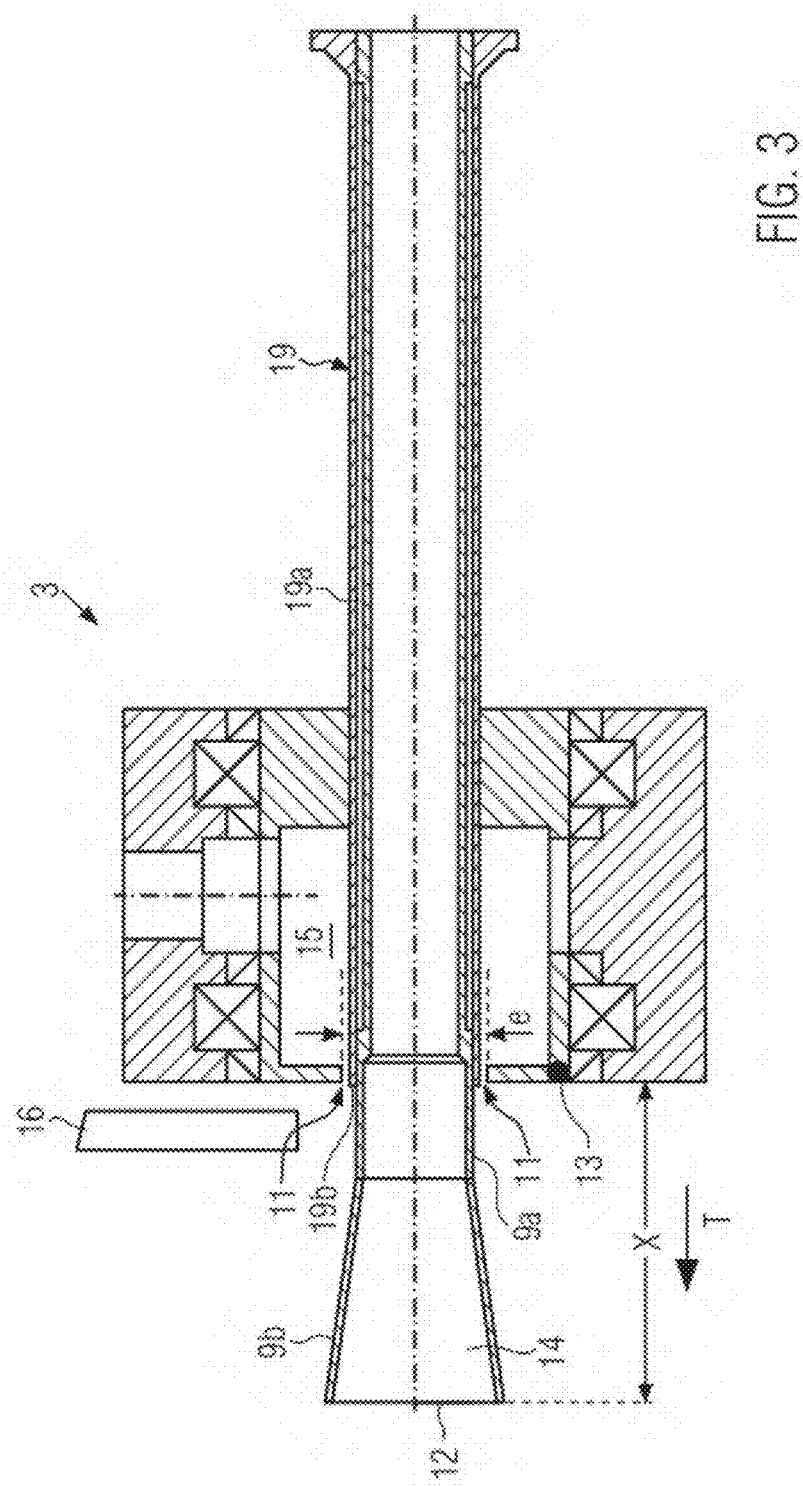
FIG. 3 shows a cross section through a co-extrusion device according to the present disclosure.

FIG. 3 shows a possible embodiment of such a co-extrusion device 3. Co-extrusion device 3 comprises a filling tube 9 for ejecting food 14 as well as an extrusion nozzle 13 being associated with filling tube 9 and with a preferably ring-shaped extrusion gap 11 for ejecting casing material 15. Although presently not shown, there are co-extrusion devices that eject casing material 15 directly onto the outer surface of food 14. However, this is difficult with liquid or low-viscosity materials. Therefore, as shown in FIG. 6, a filling tube is used which protrudes over the distance X over extrusion gap 11 such that casing material 15 is extruded through extrusion gap 11 onto filling tube 9 and can then solidify along filling tube 9 and can then be drawn off filling tube 9 together with extruded food 14. For extruded casing material 15 to begin to solidify already on filling tube 9, a device 16 for applying a fixation agent can be arranged in the region of distance X of the filling tube. A saline solution, in particular a calcium chloride solution, e.g. of 10%, is suitable as a fixation agent.

Additionally or alternatively, the device can comprise a lubricant device 19 for feeding a lubricant between filling tube 9 and ejected casing material 15. In this way, the coefficient of sliding friction between the filling tube and the ejected casing material can be minimized. For example, water can be added as a lubricant. The lubricant device comprises, for example, a feed device 19a for the lubricant. Feed device 19a is presently configured as a channel in filling tube 9. For example, the channel runs in a ring shape in the filling tube wall. In the region of extrusion gap 11, a further ring-shaped gap 19b is arranged around the outer surface of filling tube 9. For this purpose, filling tube 9 has a smaller diameter in the region behind further ring-shaped gap 19b than the filling tube in a region forward of further ring-shaped gap 19b. An internal injection of the lubricant between the ejected casing material and the surface of filling tube 9 can take place via ring-shaped gap 19b. The ejected casing material can then slide easily on the filling tube.

Due to filling tube 9 protruding over extrusion gap 11, filling tube 9 can be arranged with its outlet opening 12 particularly close to transport device 4 downstream in transport direction T.

FIG. 1 shows the first embodiment according to the present disclosure in greater detail.

As described above, device 1 comprises the co-extrusion device 3 as well as filling tube 9.

According to the present disclosure, the filling tube is a protruding filling tube that expands at least in sections in the direction of outlet opening 12 of filling tube 9—therefore it has a larger circumference, in the transport direction or ejection direction, at the rear end than at the front end, where it protrudes over the co-extrusion device. For example, the filling tube there comprises a front section 9a which is firmly connected to co-extrusion device 3 and is configured in particular to be hollow and cylindrical. This front section 9a is adjoined by a further rear section 9b of the filling tube which has an expanding cross-sectional area, in particular has a frustoconical outer contour. Front section 9a is the shorter section and has, for example, a length x1 in a range of 5-40 mm-see also FIG. 6 and can have a uniform cross section or circumference. Rear section 9b, which does not have a uniform cross-sectional area, but which expands in the ejection direction or transport direction T, has, for example, a length x2 in a range of 20-50 mm. The cross-sectional area at the beginning of region x1 can expand by >0-150% up to outlet opening 12. Rear section 9b does not necessarily have to expand conically, but can also have a cross-sectional area or outer contour that differs from the circular shape, e.g. have a polygonal outer contour, e.g. a rectangular cross-sectional shape, e.g. with rounded corners or an oval cross-sectional area or outer contour. Advantageously, rear section 9b is arranged to be exchangeable. Depending on the packages to be produced, a corresponding filling tube attachment 9b can then be attached to the forward filling tube section 9a, for example, by screw, bayonet, snap or press connection.

Rear section 9b, which is in particular exchangeable, can be formed from a different material compared to front section 9a. Rear section 9b can be formed, in particular, from plastic material, e.g. from POM, PTFE, but also from stainless steel. Due to the fact that rear section 9b is formed from plastic material, transitions between a first outer contour of the front section of filling tube 9a and rear section 9b can be fluid. For example, a cylindrical outer contour in front section 9a can transition smoothly to an expanded region with, for example, a polygonal, for example, also rectangular outer contour (possibly with rounded corners) or an oval cross-sectional area or outer contour, respectively.

However, filling tube 9 can also be configured as one piece, as the illustration in FIG. 6 on the right-hand side shows.

If, as described above, the co-extrusion device comprises a lubricant device 19, extruded casing material 15 can float on the lubricant and is not damaged even if the outer contour changes. Due to casing material 15 extruded onto filling tube 9 not yet having completely cured, it can be stretched by expanded filling tube 9. The casing thereby has a greater pre-tension, i.e. the package is filled in a plump manner. If the same package were produced with a cylindrical nozzle, i.e. a cylindrical filling tube or a filling tube with a uniform circumference and outer contour, then it would only be loosely filled because the casing material does not have a "nominal size" but expands, similar to a balloon.

Figure 2:
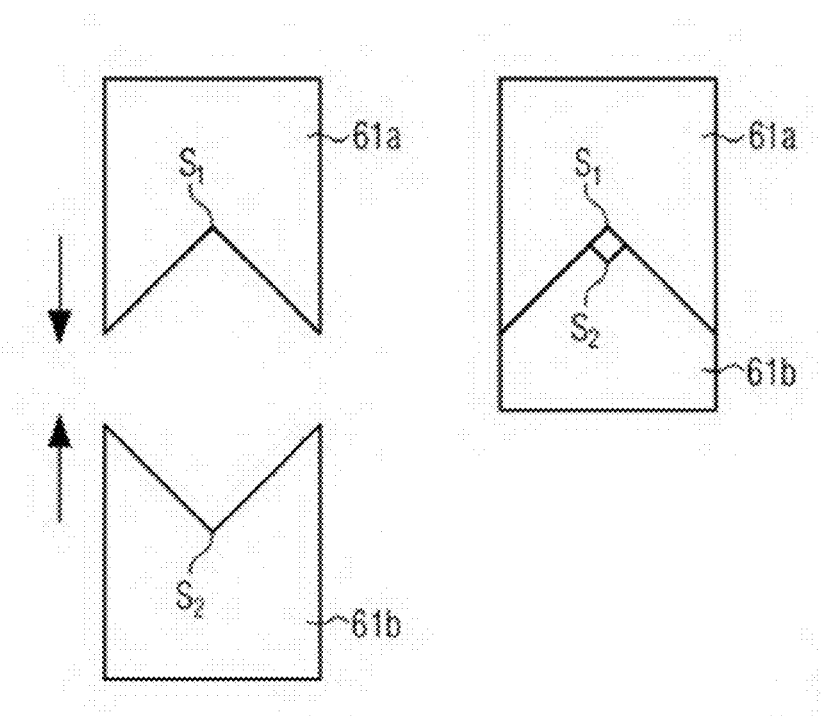
FIG. 2 schematically shows a displacement device with two oppositely disposed displacement elements.

Arranged in the transport direction downstream of the filling tube can be a sectioning device 60 which divides the material of strand 10 into individual packages and seals it. Sectioning device 60 comprises a displacement device 61 which displaces the filling material in the casing of strand 10 at a sectioning point 8. The displacement device comprises, in particular, oppositely disposed displacement elements 61a and 61b which engage in strand 10 and which are shown, for example, in FIG. 2 and each have V-shaped cutouts. The displacement elements move towards each other, as shown by the arrows in FIGS. 1 and 2, and constrict strand 10 and thus displace the filling material. As is clear from FIG. 2, rearmost points S1 and S2 of the V-shaped cutouts move towards each other and to such an extent that filling material 14 is displaced from the sectioning point, but the casing is not sheared off. As shown by the arrow in FIG. 1, sectioning device 60 beyond that comprises a linking device 62 with a corresponding linking gear by way of which filling tube 9 can be rotated about its longitudinal axis such that strand 10 is linked at sectioning point 8, i.e., the linking point there comes into play and can subsequently cure entirely. A positive substance-fit connection is created at the linking point. This embodiment furthermore comprises a transport device 4, for example, in the form of oppositely disposed circulating transport apparatuses, presently conveyor belts, between which packages 2 lie and can be transported onward in transport direction T. Transport device 4 can prevent packages 2 from rotating and hold them. During transport in transport device 4, sectioning points 8 can cure even further. For sectioning two adjacent packages, the filling tube performs, for example, 0.5-3, preferably more than 1.5, revolutions. As is illustrated e.g. in FIG. 7b, either a chain of packages can be produced or the packages can thereafter be separated from one another at sectioning points 8, also in chains of a certain number of packages 2. Due to the linking, a liquid-tight connection can be created. For example, the packages have a length k of 20-200 mm and a dimension u perpendicular to the length of 10-40 mm. The packages are filled in a plump manner and are presently bulbous.

FIGS. 4 and 5 show the second embodiment of the present disclosure, where the co-extrusion device and the filling tube are configured as described above. Only sectioning device 60 differs there and comprises oppositely disposed circulating sectioning dies 6a, 6b, as shall be explained in more detail hereafter.

The transport device there comprises oppositely disposed circulating transport apparatuses 5a, 5b, presently, for example, conveyor belts, on which spaced sectioning dies 6a, 6b are arranged. Regardless of this embodiment, for example 1-approx. 100 sectioning dies can be arranged on a circulating transport apparatuses.

In this embodiment, outlet opening 12 of filling tube 9 protrudes so far in transport direction T that outlet opening 12 of the filling tube is arranged in a deflection region between the transport apparatuses i.e. in this case in a region behind a plane E2 on which at least one of the forward deflection points P of the conveyor belts is disposed and which runs perpendicular to transport direction T, i.e. presently perpendicular to the image plane. However, filling tube 9 only extends so far into the deflection region that there is no collision with sectioning dies 6a, 6b. The distance from outlet opening 12 to plane E1, which is perpendicular to transport direction T and on which at least one of forward axes A1a, A1b, around which transport apparatuses 5a, 5b circulate, is approximately 5-30 mm.

When sectioning dies 6a, 6b circulate on the respective transport apparatuses 5a, 5b, they each pass deflection point P and are not yet aligned parallel to one another in the deflection region between planes E1 and E2. Due to the fact that the sectioning dies are not aligned parallel to one another, when they are moved towards one another in the deflection region, they strip out internal mass from the casing so that there is no internal mass but only a clean casing present in sectioning point 8 when sectioning dies 6a, 6b are then aligned parallel to each other and press casing material 15. Sectioning point 8 can thus be pressed clean and connected (homogeneously). In the case of the curable casing material, the casing material is not yet completely cured in the sectioning point, i.e. not yet completely cross-linked, so that the curable casing material can bond in positive substance-fit manner at the top and bottom of the casing in the sectioning point, just like in linking point 8 in the first embodiment. During the pressing process, sectioning dies 6a, 6b have, for example, a spacing s in a range of 0.1-0.5 mm. This spacing can change, for example, in transport direction T, for example, in that the spacing between the transport apparatuses is larger at one end that faces the filling tube than at an oppositely disposed rear end, or is the same or smaller depending on the application. For example, in the front and middle regions, the spacing can be in the range of 0.1-0.5 mm and in the rear region, the spacing can be 0.1-1.0 mm. The spacing between the sectioning dies can be adjusted independently of one another on both sides of the transport apparatuses, in particular by adjusting the distance of transport apparatuses 5a, 5b from one another.

Figure 8:
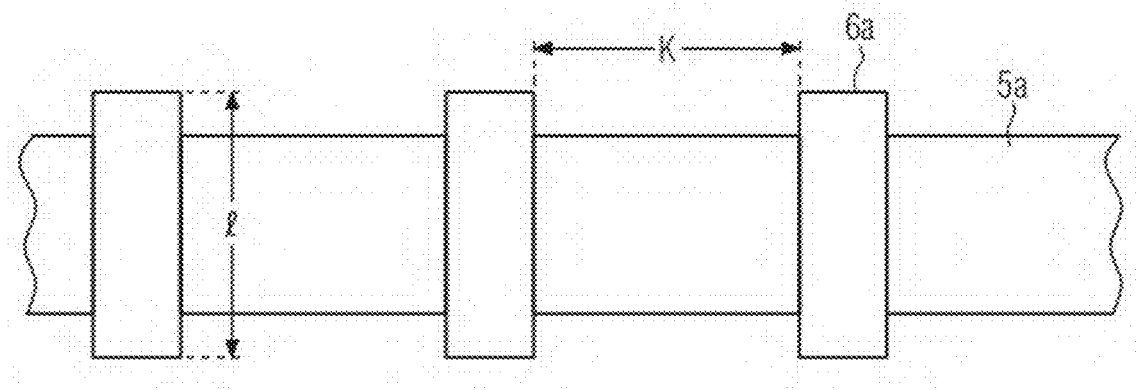
FIG. 8 schematically shows a top view onto a transport apparatus according to an embodiment of the present disclosure.
Figure 9:
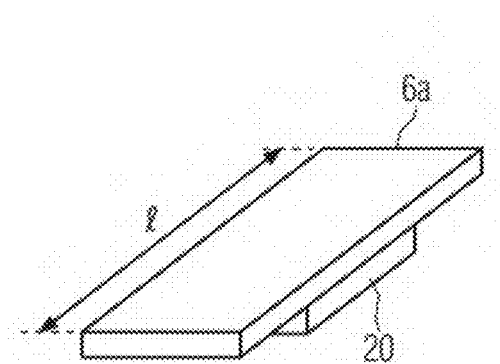
FIG. 9 schematically shows a perspective view of a sectioning die.

In FIGS. 8 and 9, sectioning dies 6a, 6b are shown in greater detail. Sectioning dies 6a and 6b have a spacing k from one another which in turn corresponds substantially to spacing k between sectioning points 8 in sachet 2 (see FIG. 4). Sectioning dies 6a, 6b each have a flat and preferably smooth pressing surface. This also contributes to a wrinkle-free sectioning point so that no liquid can escape from sectioning point 8 when a sachet is filled with liquid or low-viscosity food.

When pressed sachets 2 are transported in transport direction T, sectioning points 8 are further pressed by sectioning dies 6a, 6b so that sectioning points 8 cure further during transport and can leave the transport device in a stable state.

In both embodiments of the transport device, as shown in FIG. 4 or 1, the packages or sachets 2 can leave the device at the end either as a chain, in which the individual sachets are still connected via sectioning point 8, or individually. The packages or sachets 2 can be completely separated or perforated to form individual sachets by a separating device 17 (FIG. 10) already in transport device 4 or subsequently, namely at sectioning point 8. For this reason, it is advantageous that the sachets be pressed in a planar and in a wrinkle-free manner at sectioning point 8 such that no liquid or food can escape from sachet 2 via folds or channels or that they are linked off. It is also possible that separating device 17 is already integrated into die 6a, 6b. The flat pressing surface is then divided into two flat pressing surfaces by the separating device or the knife.

However, as already described, it is also possible to perforate the connected sachets in the region of the sectioning point using a perforating device (not shown). The sachets can then leave the device as a chain and can easily be separated by the consumer.

Figure 10:
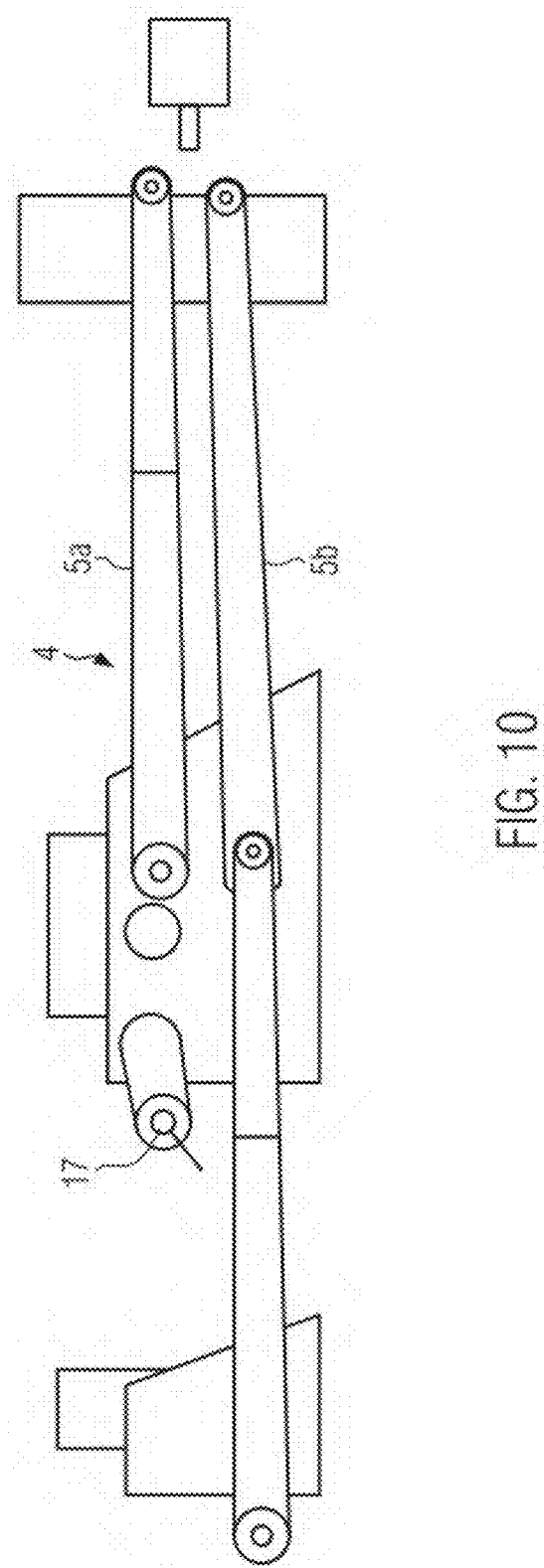
FIG. 10 shows an embodiment with an extended lower transport apparatus and an integrated separation unit.
Figure 11:
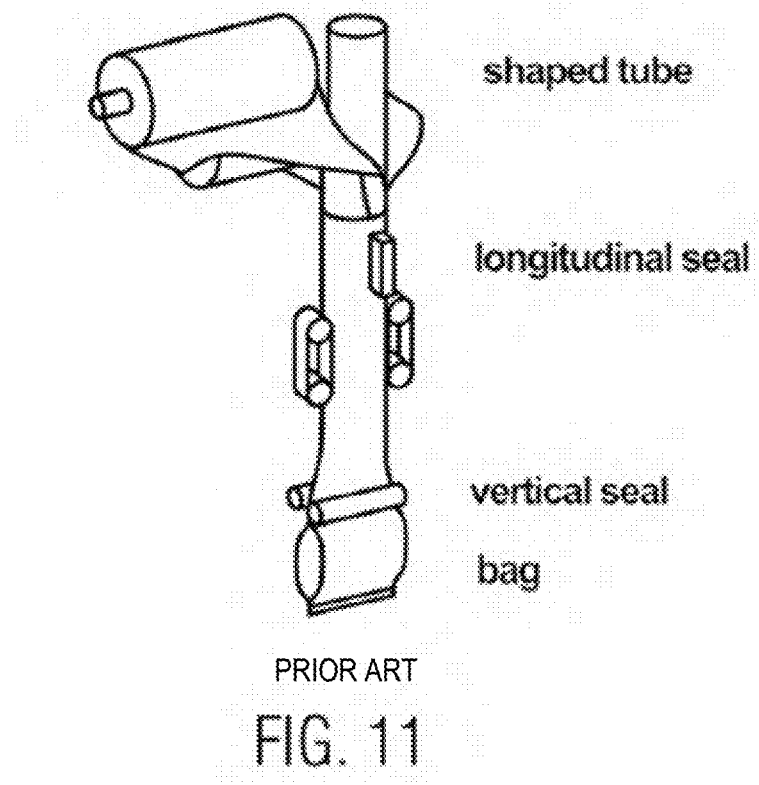
FIGS. 11 and 12 show flow pack machines according to prior art.
Figure 12:
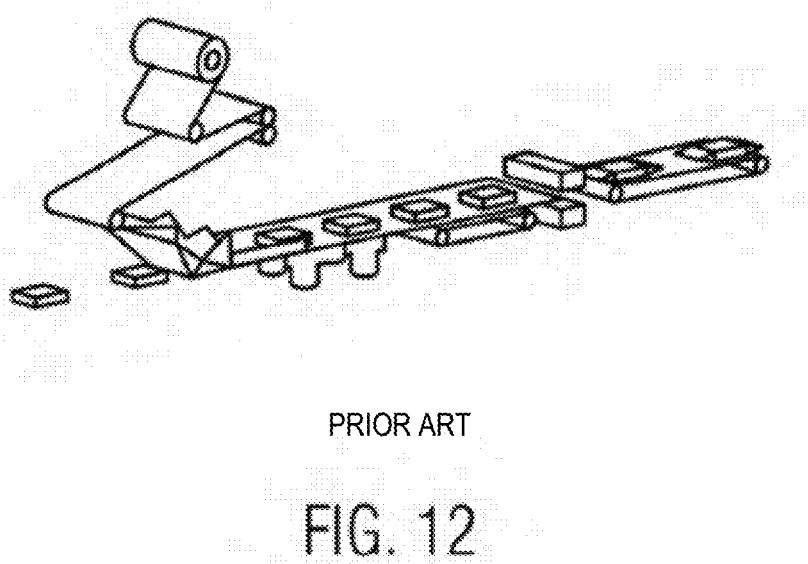

FIG. 10 shows an embodiment of the present disclosure. The embodiment presently shown corresponds substantially to the previous embodiments, although lower conveyor belt 5b is either longer than upper conveyor belt 5a or a further lower transport apparatus 5b adjoins first lower transport apparatus 5b in the transport direction so that the product strand or the packages or sachets can be transferred to the further lower belt.

In this embodiment, it is possible for a separation process into individual portions or a perforating process to take place while transportation only takes place on the lower belt. For this purpose, for example, a rotating separating device 17 can be used. For the reason that the lower transport apparatus transports the sectioned products from production to the separation process, no transfer problem arises. The separating process takes place approximately in the middle of sectioning point 8 or the linking point with little mechanical stress. The transport element, in particular the sectioning element, can also take on the function of a support for the separating element during the separating process.

The method according to the disclosure shall be explained in more detail hereafter with reference to the figures.

In the method according to the disclosure for producing filled sachets 2, a strand 10 made of a curable casing material filled with filling material, in particular food 14, is first extruded by way of co-extrusion device 3.

Prior to the sectioning process, casing material 15 is further treated with a fixation solution by way of a device 16 for applying the fixation solution. The fixation solution can be sprayed by way of device 16, for example in a ring shape, onto the casing material 15 applied to filling tube 9 and collected in a tub. A saline solution, for example, a calcium chloride solution, is particularly suitable as a fixation solution. As described above, a lubricant can also advantageously be introduced between the filling tube and casing material 15.

Co-extruded strand 10 thus produced is ejected at the end of filling tube 9.

Casing material 15, which is extruded onto filling tube 9 which is expanded in the direction of outlet opening 12, has not yet cured completely on the filling tube. This causes the casing material to stretch. This gives the product produced, i.e. package or sachet 2, a casing with greater pretension, which leads to the package or sachet being able to be filled in a plump manner. Subsequently, as described above, strand 10 is sectioned at a sectioning point either by sectioning device 60 with sectioning elements 6a, 6b or sectioning direction 60 with displacement device 61 and linking device 62. By completely displacing the filling material, a positive substance-fit connection can be created.

At this point in time, casing material 15 has not yet cured and cross-linked completely so that sectioning point 8 can be pressed and glued cleanly and the top and bottom can be connected in a liquid-tight and positive substance-fit manner. Packages or sachets 2 produced in this manner are transported onward in transport direction T. During transport in transport device 4, sectioning points 8 can further solidify and stabilize.

The packages, in particular sachets, can then be separated or perforated at sectioning point 8 or chains of a certain length can be produced.

The disclosure enables packages filled in a plump manner having an aesthetic appearance.

When changing products, the protruding filling tube 9 or at least rear section 9b of the filling tube can be easily exchanged, which then has, for example, a different percentage of expansion or a different outer contour.

The disclosure thus enables a great amount of manufacturing scope for a wide variety of products and product shapes.

The present disclosure is particularly suitable for liquid or pasty filling material, since the extruded casing material, which must first solidify, has no nominal size and the liquid or pasty filling material can also not define a nominal size either. However, the device is also advantageously suitable for co-extruding filling material with a higher viscosity such as a sausage mixture, sausage meat or veggie products, muesli bars, since the casing can then lie in a tight manner on the product.

The invention claimed is:

1. A device for producing packages filled with a filling material, said filling material being a liquid or pasty filling material, comprising:
   a co-extrusion device for co-extruding a strand made of a curable casing material filled with said filling material, wherein
   said co-extrusion device comprises a filling tube for ejecting said filling material, as well as an extrusion nozzle being associated with said filling tube and having an extrusion gap for ejecting said casing material, said filling tube being a protruding filling tube that protrudes over said extrusion gap over a distance X such that said casing material is extruded through said extrusion gap onto said filling tube and can solidify along said filling tube,
   wherein a fixation solution is applied to said protruding filling tube, and
   wherein said protruding filling tube expands at least in sections in a direction of said outlet opening.

2. The device according to claim 1, wherein
   said device comprises a lubricant device for feeding a lubricant between said filling tube and said ejected casing material.

3. The device according to claim 1, wherein
   said protruding filling tube region expands conically at least in sections in the direction of said outlet opening.

4. The device according to claim 1, wherein the protruding filling tube includes:
   a front section that, when viewed in an ejection direction, has a first cross-sectional area, and
   a rear section that, when viewed in the ejection direction, has an expanding cross-sectional area.

5. The device according to claim 4, wherein the front section has a cylindrical outer contour and the rear section has a frustoconical outer contour.

6. The device according to claim 4, wherein said protruding filling tube is arranged to be exchangeable or at least said rear section of said protruding filling tube is arranged to be exchangeable.

7. The device according to claim 4, wherein said rear section is formed from a different material compared to said front section.

8. The device according to claim 7, wherein
   said front section of said protruding filling tube has a shorter length than said rear section of said protruding filling tube.

9. The device according to claim 1, wherein a cross-sectional area of said protruding filling tube expands towards said outlet opening by a maximum of 150%.

10. The device according to claim 1, wherein said device comprises a sectioning device for dividing said strand into individual packages, and to seal them.

11. The device according to claim 10, wherein said sectioning device comprises a displacement device which displaces said filling material in said casing material in said strand at a sectioning point, and
    a linking device, via which said filling tube can be rotated such that said strand is linked at said sectioning point and can cure.

12. The device according to claim 11, wherein a transport device is arranged in a transport direction T downstream of said displacement device.

13. The device according to claim 12, wherein the displacement device is in the form of oppositely dis posed displacement elements engaging in said strand and wherein the transport device is in the form of oppositely disposed circulating transport apparatuses, between which said packages produced are transported.

14. The device according to claim 10, wherein said sectioning device comprises:
oppositely disposed circulating sectioning dies, between which said strand can be transported and which strip said filling material from said casing material at a sectioning point when they move towards one another in their trajectory, and which can press said casing material in a planar manner at said sectioning point to form a sachet.

15. The device according to claim 14, wherein said device comprises a transport device with oppositely disposed circulating transport apparatuses, on which said spaced sectioning dies are arranged,
such that, when said sachets are transported in said transport direction, said sectioning dies can further press said casing material at said sectioning points.

16. A method for producing packages filled with liquid or pasty filling material, comprising:
extruding a strand made of curable casing material filled with filling material by way of a co-extrusion device that comprises a filling tube for ejecting said filling material, as well as an extrusion nozzle being associated with said filling tube and having an extrusion gap for ejecting said casing material, said filling tube being a protruding filling tube that protrudes over said extrusion gap over a distance X such that said casing material is extruded through said extrusion gap onto said filling tube and solidifies along said filling tube, and
said casing material is drawn over said protruding filling tube which expands at least in sections in the direction of said outlet opening and is stretched,
wherein a fixation solution is applied to said protruding filling tube.

17. The method according to claim 16, wherein the fixation solution is applied to said casing material on said protruding filling tube and displaces said filling material in said strand at a sectioning point and said casing material is closed at said sectioning point by linking or by planar pressing.

18. A device for producing packages filled with a filling material, said filling material being a liquid or pasty filling material, comprising:
a co-extrusion device for co-extruding a strand made of a curable casing material filled with said filling material, wherein
said co-extrusion device comprises a filling tube for ejecting said filling material, as well as an extrusion nozzle being associated with said filling tube and having an extrusion gap for ejecting said casing material, said filling tube being a protruding filling tube that protrudes over said extrusion gap over a distance X such that said casing material is extruded through said extrusion gap onto said filling tube and can solidify along said filling tube,
wherein said protruding filling tube expands at least in sections in a direction of said outlet opening,
wherein the protruding filling tube includes:
a front section that, when viewed in an ejection direction, has a first cross-sectional area, and
a rear section that, when viewed in the ejection direction, has an expanding cross-sectional area, and
wherein said rear section is formed from a different material compared to said front section.

19. A device for producing packages filled with a filling material, said filling material being a liquid or pasty filling material, comprising:
a co-extrusion device for co-extruding a strand made of a curable casing material filled with said filling material, wherein
said co-extrusion device comprises a filling tube for ejecting said filling material, as well as an extrusion nozzle being associated with said filling tube and having an extrusion gap for ejecting said casing material, said filling tube being a protruding filling tube that protrudes over said extrusion gap over a distance X such that said casing material is extruded through said extrusion gap onto said filling tube and can solidify along said filling tube,
wherein said protruding filling tube expands at least in sections in a direction of said outlet opening,
wherein the protruding filling tube includes:
a front section that, when viewed in an ejection direction, has a first cross-sectional area, and
a rear section that, when viewed in the ejection direction, has an expanding cross-sectional area, and
wherein said front section of said protruding filling tube has a shorter length than said rear section of said protruding filling tube.

* * * * *